(12) United States Patent
Birk et al.

(10) Patent No.: US 12,298,085 B2
(45) Date of Patent: May 13, 2025

(54) HEAT EXCHANGER FOR COOLING CRACKED GAS

(71) Applicant: Borsig GmbH, Berlin (DE)

(72) Inventors: Carsten Birk, Glienicke (DE); Andreeas Förster, Berlin (DE); Michael Vogt, Dreetz (DE)

(73) Assignee: BORSIG GMBH, Berlin (DE)

( * ) Notice: Subject to any disclaimer, the term of this patent is extended or adjusted under 35 U.S.C. 154(b) by 343 days.

(21) Appl. No.: 17/866,648

(22) Filed: Jul. 18, 2022

(65) Prior Publication Data

US 2023/0025071 A1 Jan. 26, 2023

(30) Foreign Application Priority Data

Jul. 23, 2021 (DE) ..................... 10 2021 003 955.6

(51) Int. Cl.
*F28D 7/16* (2006.01)
*B23K 9/00* (2006.01)
(Continued)

(52) U.S. Cl.
CPC .............. *F28D 7/16* (2013.01); *B23K 9/0026* (2013.01); *B23K 9/0358* (2013.01); *B23K 9/173* (2013.01); *B23K 37/02* (2013.01); *B23K 37/0435* (2013.01); *F28F 9/0246* (2013.01); *F28F 2275/06* (2013.01)

(58) Field of Classification Search
CPC ... F28D 7/16; F28D 7/106; F28D 7/12; F28D 2021/0075; F28F 9/0246; F28F 2275/06; F28F 21/082; F28F 2265/16; F28F 2265/26; F28F 2270/00; F16L 13/02; F16L 39/00; F16L 39/005; F16L 53/70; B23K 9/0026; B23K 9/0358; B23K 9/173; B23K 37/02; B23K 37/0435
See application file for complete search history.

(56) References Cited

U.S. PATENT DOCUMENTS

| 5,579,831 A | 12/1996 | Bruecher |
| 5,690,168 A | 11/1997 | Cizmar et al. |
| (Continued) | | |

FOREIGN PATENT DOCUMENTS

| DE | 19707915 A1 | 9/1998 |
| DE | 19531330 C2 | 6/2003 |
| (Continued) | | |

*Primary Examiner* — Henry T Crenshaw
*Assistant Examiner* — Kamran Tavakoldavani
(74) *Attorney, Agent, or Firm* — McGlew and Tuttle, P.C.

(57) ABSTRACT

A cracked gas cooling heat exchanger includes a tube connection between an uncooled tube (1) and a cooled tube (2), having a cooled inner tube (3) enclosed by a jacket tube (4), with a tube intermediate space (5) for flowing cooling medium. A gas inlet header (11) has a GI tube inner part (12) and a GI tube outer part (13) and a cooling space (14) with an insulating layer (15). The GI tube outer part connects via a water chamber (6) to the jacket tube. The GI tube inner part faces the inner tube and is connected on a face (8) of the water chamber. A weld backing ring (16), between an end face (9) of the cooling space and a bottom face (8) of the water chamber, is in the insulating layer of the cooling space, arranged in a turn-out/groove (17) in the insulating layer.

20 Claims, 2 Drawing Sheets

(51) Int. Cl.
*B23K 9/035* (2006.01)
*B23K 9/173* (2006.01)
*B23K 37/02* (2006.01)
*B23K 37/04* (2006.01)
*F28F 9/02* (2006.01)

(56) References Cited

U.S. PATENT DOCUMENTS

| | | |
|---|---|---|
| 11,029,096 B2* | 6/2021 | Namarvar ............. F28F 9/0246 |
| 2001/0002754 A1* | 6/2001 | Dobler ................ F16L 37/0885 |
| | | 285/321 |
| 2007/0193729 A1 | 8/2007 | Spicer et al. |
| 2010/0319888 A1 | 12/2010 | Birk et al. |
| 2017/0182605 A1* | 6/2017 | Rajagopalan ............ B23K 9/32 |

FOREIGN PATENT DOCUMENTS

| | | |
|---|---|---|
| DE | 102008014978 A1 | 9/2009 |
| EP | 0810414 B1 | 4/2002 |
| EP | 2151652 B1 | 3/2013 |
| EP | 2278248 B1 | 4/2014 |

* cited by examiner

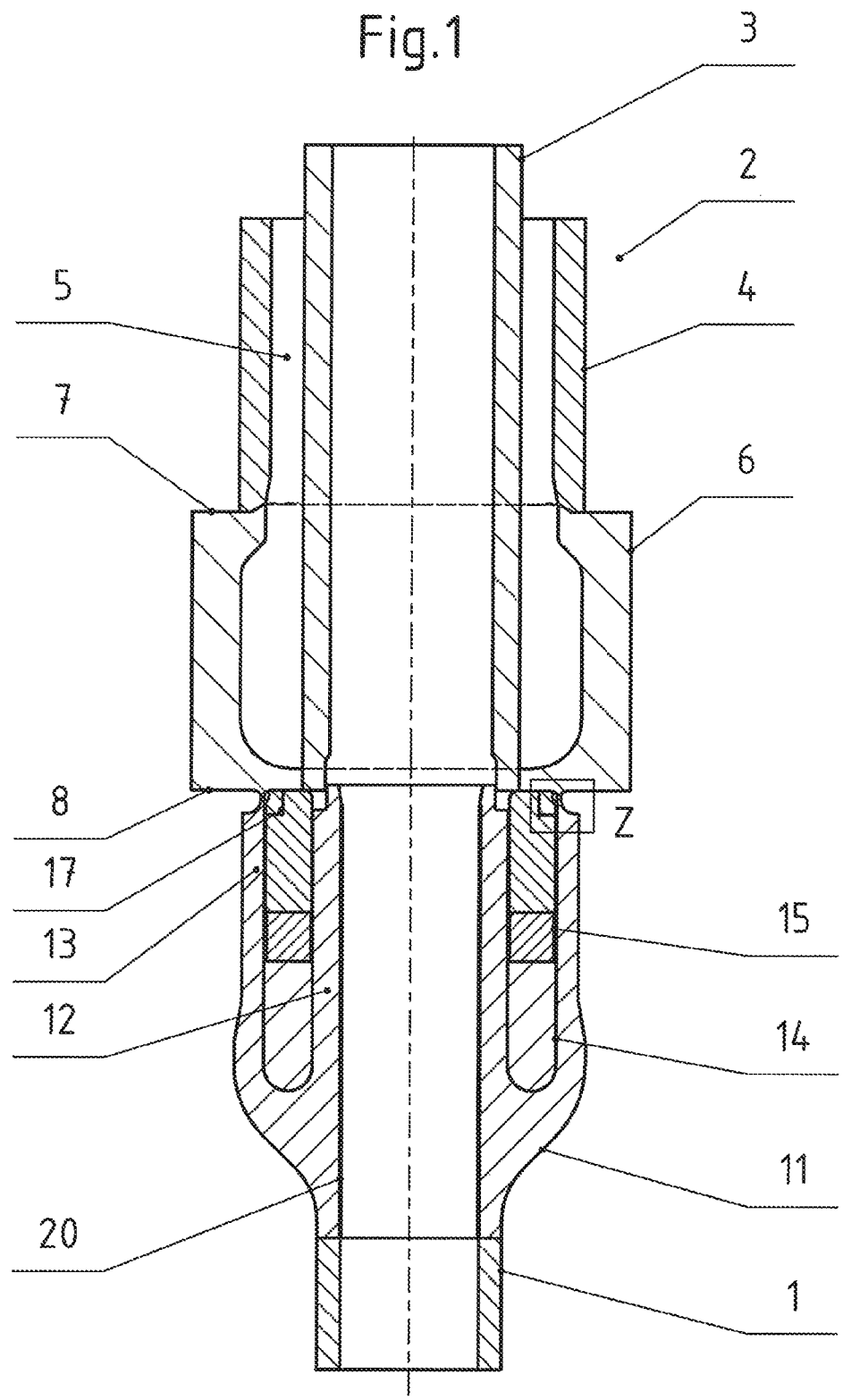

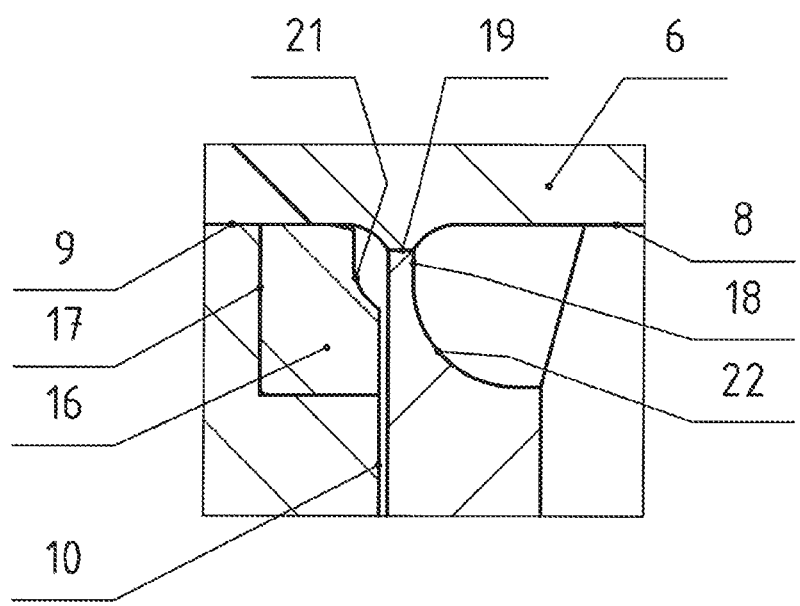

HEAT EXCHANGER FOR COOLING CRACKED GAS

CROSS REFERENCE TO RELATED APPLICATIONS

This application claims the benefit of priority under 35 U.S.C. § 119 of German Application 10 2021 003 955.6, filed Jul. 23, 2021, the entire contents of which are incorporated herein by reference.

TECHNICAL FIELD

The present invention pertains to a heat exchanger for cooling cracked gas with a tube connection between an uncooled tube and a cooled tube and to a process for connecting a tube connection between an uncooled tube and a cooled tube.

TECHNICAL BACKGROUND

Such a heat exchanger for cooling cracked gas with a tube connection between an uncooled tube and a cooled tube is well known from EP 2 278 248 B1, wherein the cooled tube is configured as a double tube. The double tube consists of a cooled inner tube and a jacket tube. The inner tube is enclosed by the jacket tube at a radial distance, forming a tube intermediate space, through which a cooling medium flows. The cooled tube is in connection with the uncooled tube via a water chamber and an inlet header, which is connected to the uncooled tube and is forked (bifurcated) in cross section. The inlet header has an inner tube section and an outer tube section. An intermediate space is formed between the inner tube section and the outer tube section and is filled with a heat insulation consisting of a plurality of layers of a heat-insulating material. The outer tube section is connected via the water chamber to the jacket tube. The inner tube section faces the cooled inner tube at a short axial distance on the end face of the water chamber on the side of the inlet header. A ring is arranged between the end faces of the inner tube and the inner tube section.

Such a heat exchanger for cooling cracked gas with a tube connection is also known from DE 195 31 330 C2. Cracked gas is produced by a thermal cracking of hydrocarbons in a cracked gas furnace. Such cracked gas furnaces are provided with a number of cracked gas tubes, which are heated on the outside and through which the hydrocarbons used are carried with the addition of water vapor. The cracked gas produced leaves the cracked gas tubes at a temperature of up to 900° C. and must be cooled off very rapidly to stabilize its molecular composition. The rapid cooling of the cracked gas is carried out in cracked gas columns by means of an indirect transfer of heat from the cracked gas to evaporating water, which is under high pressure.

In case of the tube connection known from DE 195 31 330 C2, the end of the uncooled tube is provided with an inlet header, which is configured as forked in cross section and has an inner tube section and an outer tube section. The formed intermediate space between the two tube sections is filled with a heat-insulating material. The outer tube section is welded together with the jacket tube of the cooled double tube. The inner tube section faces the inner tube of the cooled double tube at an axial distance, wherein a seal configured as a ring (C, O, U or V shape) is located between the end faces of the inner tube section and of the inner tube, which ring shall prevent cracked gas from penetrating into the heat-insulating material.

A forked inlet header filled with heat-insulating material for connecting an uncooled tube to a cooled tube is also used for cooling cracked gas in case of the heat exchanger known from EP 810 414 B1. In case of the prior-art heat exchanger, the cooled tube consists of an inner tube, which is enclosed by a jacket tube at a radial distance. A water chamber for feeding a cooling medium encloses the inlet end of the cooled tube. The water chamber consists of a solid, square piece, into which a recess or turn-out that is circular in cross section is inserted. The turn-out accommodates a single cooled tube, wherein the inner tube of the cooled tube is welded into the bottom of the turn-out and the jacket tube is welded together with the water chamber. The outer tube section of the inlet header is welded onto the water chamber on the side facing away from the jacket tube, while the inner tube section of the inlet header faces the inner tube of the cooled tube at an axial distance.

A heat exchanger with a connection piece between a cracking tube of a cracking furnace and a cooling tube of a cracked gas column is known from EP 2 151 652 B1. The cooling tube is configured here as a double tube with an inner tube arranged in the extension of the cracking tube and with an outer tube enclosing the inner tube, forming a cooling intermediate space. The cooling intermediate space is connected to a feed chamber or water chamber for feeding a cooling medium. Furthermore, the cracking tube is in connection with a transfer piece or inlet header, the end section of which is configured as forked in cross section and has an inner section and an outer section, between which a layer consisting of a heat-insulating material is inserted. The water chamber is configured as one unit with the inlet header. A process for connecting a cracking tube to a cooling tube is described.

The prior-art heat exchangers with the arranged inlet headers make possible a heat-related length expansion in an unrestricted manner because of the axial clearance between the inner tube and the inner tube section. The inserted heat insulation causes the outer tube section of the inlet header, which is permanently connected to the cooled tube, to assume a wall temperature, which is below the temperature of the gas flowing through the uncooled tube. The wall temperatures, which reach the tubes at the connecting point, align with each other in this manner, so that the thermal stresses at the connecting point are minimized.

An essential goal of a gas inlet header in a heat exchanger is to establish a connection between a cracked gas furnace and a cracked gas column or heat exchanger. One difficulty of the goal is due to the fact that two different materials are brought together under high temperatures, and especially a nickel-based material of a cracked gas furnace and a fine-grained structural steel or C steel of a water chamber of a cracked gas column or heat exchanger, especially without the different heat expansion coefficients leading to a failure or to a leaking of the connection.

Up to now, a special configuration for a gas inlet header of a heat exchanger that allows or ensures a compatible temperature difference for a welded connection of the gas inlet header and the water chamber with the respective different materials has been developed in the technology. In this case, a so-called C ring or sealing ring, which shall prevent the penetration of ethylene in the intermediate space of a gas inlet header, which intermediate space is filled with heat-insulating material, during the operation of a plant, is important in case of such a welded connection.

A penetration of ethylene is to be prevented if a defined weld shrinkage can be maintained in case of a welded connection of a gas inlet header to a water chamber. Such a defined weld shrinkage is ensured by a gas inlet header being attached and welded onto a water chamber without an air gap with an about 3-mm-thick welding lip. A defined weld shrinkage is then always maintained. A remaining area of an about 3-mm-thick welding lip, which is formed at a gas inlet header and is not welded, remains, however, after the welding of such a weld seam connection. It is a weld seam that is not welded through.

SUMMARY

A basic object of the present invention is to configure the heat exchanger of this type with a tube connection between an uncooled tube and a cooled tube so that the weld seam connection of a gas inlet header to a water chamber is fully welded through, without a remaining area of the weld seam connection, which is not welded through, remaining. Furthermore, one object is to create a process, which ensures a weld seam connection of a gas inlet header to a water chamber by a fully welded-through weld seam in a heat exchanger.

The basic object is accomplished by features of a heat exchanger according to the present invention in case of a heat exchanger of this type, which comprises a tube connection between an uncooled tube and a cooled tube. Advantageous embodiments of the present invention are disclosed.

It has been proven to be especially advantageous that a ring configured as a weld pool backing ring is arranged between an end face of a cooling intermediate space of a gas inlet header and a WC (water chamber) bottom end face of a water chamber. Another advantage can be seen in that the weld pool backing ring is arranged in a mounted turn-out or groove in the insulating layer consisting of heat-insulating material on the end face of the cooling intermediate space and is in contact with a tube inner surface of the GI (gas inlet header) tube outer part. Provisions are preferably made for the insulating layer and the weld pool backing ring to have a small overhang extent (a projection—an axial extent) of 0.3 mm to 1.3 mm over (beyond) the welding edge (axial extent) of the gas inlet header. In other words, the insulating layer with the weld pool backing ring projects, in an axial direction toward the water chamber, 0.3 mm to 1.3 mm beyond the welded edge of the gas inlet header. An overhang (projecting distance) of 0.5 mm is preferred.

Further, a major advantage is that the weld pool backing ring is embedded firmly (with a pressing force) in the insulating layer consisting of heat-insulating material on the end face of the cooling intermediate space and is pressed onto a tube inner surface of the GI tube outer part.

Another advantage can be seen in that the weld pool backing ring is provided with a concave recess on the end face opposite the tube inner surface of the GI tube outer part. Further, a ring-shaped end piece at the discharging end of the GI tube outer part on the end face of the cooling intermediate space and the WC bottom end face of the water chamber advantageously have, located opposite one another, a formed GI welding lip/WC welding lip with a web width of 0.5 mm to 1.5 mm.

The weld pool backing ring is preferably provided with a concave recess with a radius of 0.5 mm on the end face towards the tube inner surface of the GI tube outer part. One advantage is that the end piece at the discharging end of the GI tube outer part on the end face of the cooling intermediate space and the WC bottom end face of the water chamber form a GI welding lip/WC welding lip, with the respective lips located opposite one another with a web width of 1.0 mm.

A special advantage is that the weld pool backing ring and the GI tube outer part as well as the WC bottom end face with formed welding lips located opposite one another are welded together with the water chamber with a fully welded-through weld seam in full connection without a remaining gap.

Another advantage is shown in that the weld pool backing ring is made of (formed of) a ceramic or metallic material and is configured as a sealing ring and as an insulating ring.

A basic object of a process is accomplished according to process features of the present invention for connecting an uncooled tube and a cooled tube of a heat exchanger to provide a heat exchanger with a tube connection between an uncooled tube and a cooled tube. Advantageous embodiments of the process of the present invention are disclosed.

It is considered to be especially advantageous in a process for connecting a tube connection between an uncooled tube and a cooled tube that a gas inlet header with a weld pool backing ring, which is embedded in an inserted insulating layer in the cooling intermediate space and is in contact with a tube inner surface of a GI tube outer part, is clamped into a conventional device (conventional jig) for preparing a weld seam. One advantage for preparing a weld seam connection is that the gas inlet header is attached to a water chamber without air gap on a GI welding lip formed by the gas inlet header at the ring-shaped end piece by the GI tube outer part on an end face of the cooling intermediate space and on a WC welding lip formed at a WC bottom end face of a water chamber located opposite the GI welding lip. Another advantage is provided by the fact that a first welding layer of the weld seam is carried out with an MAG (Metal Active Gas) welding torch and an MAG welding wire with a welding filler material for a root protection. Advantageously, the weld slag formed on the top side of the first welding layer is removed entirely mechanically. Furthermore, an advantage can be seen in that the remaining weld seam is welded or filled with a usual welding material over the first welding layer in a pass in 2n welding layers or welding beads, wherein n=1-12, preferably n=3-8.

It is advantageous, moreover, that the weld pool backing ring is inserted into the provided turn-out or groove in the insulating layer consisting of heat-insulating material on the end face, wherein the weld pool backing ring and the insulating layer are attached with a small overhang of 0.3 mm to 1.3 mm over the welded edge of the gas inlet header. An overhang of 0.5 mm is preferred.

The gas inlet header is advantageously attached to the water chamber using a conventional device, not shown, and the gas inlet header is positioned at the welding position and is pressed onto the water chamber with the protruding insulating layer consisting of heat-insulating material and with the protruding weld pool backing ring without a remaining air gap and is tack-welded at three to four points of the weld seam provided.

The prepared tube connection is advantageously fed to a conventional automatic welding machine, not shown, and is clamped with a three jaw or four-jaw chuck on the gas inlet inner side of the gas inlet header, and a first welding torch is guided into the weld joint of the weld seam provided.

One essential advantage is that the first welding layer is prepared with a metal welding process with active gases and with a welding filler material with a strong slag formation. The slag that is formed, is formed between the melt pool that is formed and the weld pool backing ring and the melt that is formed is protected by the slag being formed against atmospheric oxygen.

The deposited weld slag on the top side of the first welding layer is advantageously mechanically removed entirely after welding of the first welding layer or of a root layer and the remaining weld seam is welded and filled with a second welding torch of the automatic welding machine and with a usual welding material in a pass with 2n welding layers or weld beads, where n=1-12, preferably n=3-8.

The remaining weld seam is preferably closed and filled with a welding material consisting of solid wire in a pass with 2n welding layers or weld beads.

Additional advantages and details of the present invention are shown and explained below in an exemplary embodiment on the basis of the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a longitudinal sectional view through the bottom part of a heat exchanger with a tube connection according to the present invention on a reduced scale; and FIG. 2 is a detail Z according to FIG. 1, shown on an enlarged scale before welding.

DESCRIPTION OF PREFERRED EMBODIMENTS

Referring to the drawings, FIG. 1 shows a longitudinal section through the bottom part of a heat exchanger, not shown, with a tube connection between an uncooled tube 1 and a cooled tube 2. The cooled tube 2 is configured as a double tube and consists of a cooled inner tube 3 and a jacket tube 4. The inner tube 3 is enclosed by the jacket tube 4 at a radial distance, forming a tube intermediate space 5, through which a cooling medium flows.

The cooled tube 2 is in connection with the uncooled tube 1 via a water chamber 6 (abbreviated as WC) and a gas inlet header 11 (abbreviated as GI), which is connected to the uncooled tube and is forked in cross section. The gas inlet header is aligned flush with its gas inlet inner side 20 on the uncooled tube 1 and has a GI tube inner part 12 and a GI tube outer part 13. A cooling intermediate space 14, into which an insulating layer 15 consisting of a heat-insulating material is inserted, is formed between the GI tube inner part 12 and the GI tube outer part 13.

The GI tube outer part 13 of the gas inlet header 11 is connected via the water chamber 6 to the jacket tube 4 of the cooled tube 2 on a WC end face 7. The GI tube inner part 12 of the gas inlet header 11 faces the cooled inner tube 3 at an axial distance of about 0.3 mm to 1.3 mm on a WC bottom end face 8 of the water chamber 6.

As is shown in FIG. 2, a weld pool backing ring 16, which is in contact with a tube inner surface 10 of the GI tube outer part 13, is arranged on an end face 9 of the cooling intermediate space 14 in the inserted insulating layer 15 consisting of heat-insulating material.

The weld pool backing ring 16 is arranged in a mounted turn-out or groove 17 in the insulating layer 15 consisting of heat-insulating material on the end face 9 of the cooling intermediate space 14 and is in contact with a tube inner surface 10 of the GI tube outer part 13. The insulating layer 15 consisting of heat-insulating material and the weld pool backing ring 16 have a short overhang (axial extension) of 0.3 mm to 1.3 mm over (beyond) the welded edge of the gas inlet header 11 on the end face 9 of the cooling intermediate space 14. An overhang of 0.5 mm is preferred.

The weld pool backing ring 16 is embedded firmly (embedded with a pressing force) in the insulating layer 15 consisting of heat-insulating material on the end face 9 of the cooling intermediate space 14 and is pressed onto the tube inner surface 10 of the GI tube outer part 13.

The weld pool backing ring 16 is provided with a concave recess 21 on the end face 9 of the cooling intermediate space 14 in contact with the tube inner surface 10 of the tube outer part 13. On the end face 9 of the cooling intermediate space 14 of the gas inlet header 11, a circumferential GI welding lip 18 in the form of a web is provided at the discharging end piece 22 of the GI tube outer part 13. A circumferential WC welding lip 19 is likewise formed on the WC bottom end face 8 of the water chamber 6. The respective GI/WC welding lips 18, 19 are arranged opposite one another and are each formed with a web width of 0.5 mm to 1.5 mm. A web width of 1.0 mm is preferred.

Furthermore, the weld pool backing ring 16 and the GI tube outer part 13 of the gas inlet header 11 and the WC bottom end face 8 of the water chamber with the respective mounted, circumferential GI/WC welding lip 18, 19 are connected to the water chamber 6 in full connection without a remaining gap with fully welded-through weld seam by welding with an MAG welding torch using a slag-carrying welding filler material for the first welding layer or root layer and the complete removal of the weld slag on the first welding layer and filling of the remaining weld seam with 2n welding layers or weld beads of a welding torch with a usual welding material without a welding filler, wherein n=1-12 and preferably n=3-8.

The weld pool backing ring 16, which consists of a ceramic or metallic material, is configured as a sealing ring and as an insulating ring.

In a process for connecting a tube connection between an uncooled tube 1 and a cooled tube 2 of a heat exchanger, not shown, a gas inlet header 11 is attached to a conventional device (conventional jig), not shown, in a first step, wherein a cooling intermediate space 14, in which an insulating layer 15 consisting of heat-insulating material is inserted, is formed between a GI tube inner part 12 and a GI tube outer part 13.

In a second step, a weld pool backing ring 16 is embedded into a mounted turn-out or groove 17 in the insulating layer 15 consisting of heat-insulating material on an end face 9 of the cooling intermediate space 14, wherein the insulating layer 15 consisting of heat-insulating material and the weld pool backing ring 16 have a small overhang of about 0.3 mm to 1.3 mm over the welded edge of the gas inlet header 11, and an overhang of 0.5 mm is preferably provided.

In a third step, the gas inlet header 11 is attached to the water chamber 6 without air gap by means of a conventional device, not shown. A mounted GI welding lip 18 at the discharging end piece 22 of the GI tube outer part 13 of the gas inlet header 11 is aligned with a WC welding lip 19 formed on an opposite water chamber bottom end side 8 of the water chamber 6 and is positioned at a welding layer and is tack-welded at three to four points in the circumferential area of a round weld seam of the welding layer. The insulating layer 15 mounted with a small overhang of about 0.5 mm and the weld pool backing ring 16 provided with a small overhang of 0.5 mm are pressed onto the water chamber 6 without a remaining air gap by means of a device, not shown.

Such an attachment of the gas inlet header 11 to the water chamber is prevented in case of a prior-art Wolfram Inert Gas welding process, because no forming gas can be guided to the root area for the necessary root protection of the root weld seam.

After attaching the gas inlet header 11 to the water chamber 6 and after tack welding at three to four points in the circumferential area of the welding layer, the component is fed to a conventional automatic welding machine, not shown, and clamped with a three-jaw/four-jaw chuck on a gas inlet inner side 20 of the gas inlet header.

The automatic welding machine, not shown, guides by scanning a Metal Active Gas welding torch, not shown, or MAG welding torch into the prepared weld joint of the weld seam. The weld seam is prepared by the GI welding lip 18 with a web width of 1.0 mm, which is formed on the discharging end piece 22 of the tube outer part 13 of the gas inlet header 11, and the counterpiece of the WC welding lip 19, likewise with a web width of 1.0 mm, which is formed on a WC bottom end face 8 of the water chamber, being aligned with one another.

The first welding layer is carried out (prepared) with the MAG welding torch and an MAG welding wire with a welding filler material for a strong slag formation or as slag-carrying, wherein the weld slag being formed is formed between the weld pool being formed and the weld pool backing ring 16. As a result of the weld slag being formed, the melt being formed is protected against atmospheric oxygen, so that a reaction with atmospheric oxygen is prevented. The first welding layer is welded exclusively with an MAG welding wire with welding filler material.

In another step, the weld slag formed on the top side of the first welding layer is entirely removed mechanically after the welding of the first welding layer.

The welding torch is again positioned in the welding layer by the welding robot with a usual welding material, and the remaining weld seam above the first welding layer is welded and filled in a pass with 2n welding layers or weld beads with the usual welding material, and preferably a solid wire, wherein n=1-12, preferably n=3-8.

It is achieved and ensured with the process that the gas inlet header 11 is fully welded through to the water chamber 6 of a heat exchanger at the critical point of the tube connection of an uncooled tube 1 with a cooled tube 2, without a remaining area of a weld seam, which is not fully welded through, remaining.

It is further guaranteed with the process that a constantly defined weld shrinkage can be maintained in the welded connection of a GI tube outer part of a gas inlet header to a water chamber. Such a defined weld shrinkage is ensured by a gas inlet header being aligned with a GI welding lip which is mounted at the discharging end piece of a GI tube outer part on a WC welding lip arranged opposite a WC bottom end face with a respective web width of 0.5 mm to 1.5 mm, preferably 1.0 mm, and being attached and welded onto a water chamber without air gap.

While specific embodiments of the invention have been shown and described in detail to illustrate the application of the principles of the invention, it will be understood that the invention may be embodied otherwise without departing from such principles.

LIST OF REFERENCE NUMBERS

1 Uncooled tube
2 Cooled tube
3 Cooled inner tube
4 Jacket tube
5 Tube intermediate space
6 Water chamber
7 WC end face
8 WC bottom end face
9 End face
10 Tube inner surface
11 Gas inlet header
12 GI tube inner part
13 GI tube outer part
14 Cooling intermediate space
15 Insulating layer consisting of heat-insulating material
16 Weld pool backing ring
17 Turn-out or groove
18 GI welding lip
19 WC welding lip
20 GI inner side
21 Concave recess
22 End piece of GI tube outer part

What is claimed is:

1. A heat exchanger for cooling cracked gas, the heat exchanger comprising:
   a cooled tube configured as a double tube comprising a cooled inner tube and a jacket tube, the cooled inner tube being enclosed by the jacket tube at a radial distance to form a tube intermediate space, through which a cooling medium flows;
   an uncooled tube;
   a tube connection between the uncooled tube and the cooled tube, the tube connection comprising:
      a water chamber having a water chamber end face and a water chamber bottom end face;
      a gas inlet header connected to the uncooled tube, the gas inlet header having a forked cross section and comprising a tube inner part and a tube outer part, defining a cooling intermediate space therebetween, and an insulating layer of a heat-insulating material in the cooling intermediate space, wherein the tube outer part is connected via the water chamber to the jacket tube, with the tube outer part connected to the water chamber end face and the tube inner part facing the water chamber bottom end face at an axial distance therefrom; and
      a ring configured as a weld pool backing ring arranged between an end face of the cooling intermediate space and the water chamber bottom end face and inserted into the insulating layer of the cooling intermediate space in a mounted turn-out or groove in the insulating layer on the end face of the cooling intermediate space, wherein the weld pool backing ring is in contact with a tubular inner surface of the tube outer part, wherein the insulating layer with the weld pool backing ring provide an overhang of 0.3 mm to 1.3 mm over a welded edge of the gas inlet header.

2. The heat exchanger in accordance with claim 1, wherein the weld pool backing ring is embedded with a force in the insulating layer on the end face of the cooling intermediate space and is pressed onto the tube inner surface of the tube outer part.

3. The heat exchanger in accordance with claim 1, wherein:
   the weld pool backing ring is provided with a concave recess opposite the tube inner surface on the end face of the cooling intermediate space;

the tube outer part has a discharging end with a ring-shaped end piece forming a gas inlet header welding lip formed on or adjacent to the end face of the cooling intermediate space;

the water chamber has an opposite welding lip at the bottom end face of the water chamber; and the gas inlet header welding lip and the opposite welding lip have a web width of 0.5 mm to 1.5 mm.

4. The heat exchanger in accordance with claim 3, wherein:

the weld pool backing ring is formed on the end face of the cooling intermediate space towards the tube inner surface with a concave recess with a radius of 0.5 mm; and the tube outer part on or adjacent to the end face of the cooling intermediate space and the bottom end face of the water chamber have, located opposite one another, the gas inlet header welding lip and the opposite welding lip with a web width of 1.0 mm.

5. The heat exchanger in accordance with claim 3, wherein the weld pool backing ring and the tube outer part and the water chamber bottom end face with the gas inlet header welding lip and the opposite welding lip are welded together with a fully welded-through weld seam in full connection without a remaining gap.

6. The heat exchanger in accordance with claim 1, wherein the weld pool backing ring is formed of a ceramic or metallic material and is configured as a sealing ring and as an insulating ring.

7. The heat exchanger in accordance with claim 1, wherein the tube outer part comprises a tube outer part outermost surface, the weld pool backing ring being located at a spaced location from the tube outer part outermost surface.

8. A process for connecting an uncooled tube and a cooled tube of a heat exchanger for cooling cracked gas with a tube connection between the uncooled tube, the process comprising the steps of:

clamping a weld pool backing ring, embedded in an insulating layer inserted in a cooling intermediate space of a gas inlet header, in contact with a tube inner surface of a tube outer part of the gas inlet header, in a device for preparing a weld seam connection from the gas inlet header to a water chamber;

attaching the gas inlet header to the water chamber without air gap with contact of a gas inlet welding lip of the gas inlet header, at a ring-shaped end piece of the tube outer part of the gas inlet header, on an end face of the cooling intermediate space with a water chamber sealing lip, formed at a water chamber bottom end face of the water chamber located opposite the gas inlet welding lip;

preparing a first welding layer with a metal active gas welding torch and with a metal active gas welding wire with a welding filler material for a root protection;

mechanically removing weld slag formed on a top side of the first welding layer; and welding or filling a remaining weld seam with a welding material over the first welding layer in one pass in 2n welding layers or welding beads.

9. The process in accordance with claim 8, wherein:

the weld pool backing ring is inserted into a provided turn-out or groove in the insulating layer of heat-insulating material on the end face; and the insulating layer and the weld pool backing ring are arranged with an overhang of 0.3 mm to 1.3 mm over a welded edge of the gas inlet header.

10. A process in accordance with claim 9, wherein the weld pool backing ring and the insulating layer are inserted with the overhang of 0.5 mm over the welded edge of the gas inlet header.

11. The process in accordance with claim 10, wherein:

the gas inlet header is attached to the water chamber by means of the device;

the gas inlet header is positioned at the welding position; and the gas inlet header is pressed onto the water chamber with the protruding insulating layer and the protruding weld pool backing ring without a remaining air gap and tack-welded at three to four points of the weld seam to be formed.

12. The process in accordance with claim 11, wherein:

the prepared tube connection is fed to an automatic welding machine and clamped with a three-jaw or four-jaw chuck on a gas inlet inner side of the gas inlet header; and the metal active gas welding torch of the automatic welding machine is guided into the weld joint of the weld seam.

13. The process in accordance with claim 12, wherein the first welding layer is executed with a metal welding process with active gases and with a welding filler material with a slag formation;

the weld slag is formed between a melt pool formed and the weld pool backing ring; and the melt formed is protected by the weld slag being formed against atmospheric oxygen.

14. The process in accordance with claim 13, wherein:

deposited weld slag on a top side of the welding layer is entirely mechanically removed after welding of the first welding layer;

the remaining weld seam is welded and filled with a second welding torch of the automatic welding machine and with a usual welding material in a pass with second welding layers or weld beads.

15. The process in accordance with claim 14, wherein the remaining weld seam is closed and filled with a solid wire in a pass with 2n welding layers or weld beads, wherein n is 1 to 12.

16. The process in accordance with claim 15, wherein a remaining weld seam is closed and filled with a solid wire in a pass with 2n welding layers or weld beads, wherein n is 3 to 8.

17. The process in accordance with claim 15, wherein the tube outer part of the gas inlet header comprises a tube outer part outermost surface, the weld pool backing ring being located at a spaced location from the tube outer part outermost surface.

18. A heat exchanger for cooling cracked gas, the heat exchanger comprising:

a cooled tube configured as a double tube comprising a cooled inner tube and a jacket tube, the cooled inner tube being enclosed by the jacket tube at a radial distance to form a tube intermediate space, through which a cooling medium flows;

an uncooled tube;

a tube connection between the uncooled tube and the cooled tube, the tube connection comprising:

a water chamber having a water chamber end face and a water chamber bottom end face;

a gas inlet header connected to the uncooled tube, the gas inlet header having a forked cross section and comprising a tube inner part and a tube outer part, defining a cooling intermediate space therebetween, and an insulating layer of a heat-insulating material in the cooling intermediate space, wherein the tube outer part is connected via the water chamber to the jacket tube, with the tube outer part connected to the water chamber end face and the tube inner part facing the water chamber bottom end face at an axial distance therefrom; and a ring configured as a weld pool backing ring arranged between an end face of the cooling intermediate space and the water chamber bottom end face and inserted into the insulating layer of the cooling intermediate space in a mounted turn-out or groove in the insulating layer on the end face of the cooling intermediate space, wherein the weld pool backing ring is in contact with a tubular inner surface of the tube outer part, the tube outer part comprising a tube outer part peripheral surface, the tubular inner surface and the weld pool backing ring being located radially inward of the tube outer part peripheral surface with respect to a longitudinal axis of the gas inlet header.

19. The heat exchanger in accordance with claim 18, wherein the insulating layer with the weld pool backing ring provide an overhang of 0.3 mm to 1.3 mm over a welded edge of the gas inlet header.

20. The heat exchanger in accordance with claim 19, wherein the weld pool backing ring is located at a spaced location from the tube outer part peripheral surface.

* * * * *